(12) United States Patent
Chundury et al.

(10) Patent No.: US 11,025,551 B2
(45) Date of Patent: *Jun. 1, 2021

(54) WEIGHTED FAIR QUEUEING USING SEVERITY-BASED WINDOW IN RELIABLE PACKET DELIVERY NETWORK

(71) Applicant: Cisco Technology, Inc., San Jose, CA (US)

(72) Inventors: Jagadish Chundury, Chennai (IN); Kodandaram Ponaka, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/162,002

(22) Filed: Oct. 16, 2018

(65) Prior Publication Data

US 2019/0075058 A1 Mar. 7, 2019

Related U.S. Application Data

(63) Continuation of application No. 15/160,436, filed on May 20, 2016, now Pat. No. 10,135,747.

(51) Int. Cl.
   *H04L 12/807* (2013.01)
(52) U.S. Cl.
   CPC ................... *H04L 47/27* (2013.01)
(58) Field of Classification Search
   CPC ......................................................... H04L 47/27
   See application file for complete search history.

(56) References Cited

U.S. PATENT DOCUMENTS

| 6,862,265 | B1 | 3/2005 | Appala et al. |
| 8,159,939 | B1* | 4/2012 | Kaufman ................ H04L 47/41 370/229 |
| 8,873,385 | B2* | 10/2014 | Wu ....................... H04L 69/163 370/230 |
| 9,019,824 | B2 | 4/2015 | Thubert et al. |
| 2008/0049624 | A1 | 2/2008 | Ray et al. |
| 2008/0225842 | A1* | 9/2008 | Goldfein ............... H04L 1/1825 370/389 |

(Continued)

OTHER PUBLICATIONS

Seshan, "Computer Networking: Fair Queuing", Carnegie Mellon University, [online], [retrieved on Feb. 11, 2016]. Retrieved from the Internet: URL: <http://www.cs.cmu.edu/~srini/15-744/F10/lectures/05-fairq.pdf>, pp. 1-19.

(Continued)

*Primary Examiner* — Donald L Mills
(74) *Attorney, Agent, or Firm* — Leon R. Turkevich

(57) ABSTRACT

In one embodiment, a method comprises a network device detecting an event severity encountered by the network device; the network device selectively changing a window size, for a maximum number of unacknowledged data packets that can be sent by the network device to a receiver device, to correspond to the event severity encountered by the network device; and the network device transmitting, to the receiver device, a number of data packets up to the window size, enabling the receiver device to detect the corresponding event severity encountered by the network device based on the number of unacknowledged data packets received by the receiver device from the network device.

18 Claims, 4 Drawing Sheets

(56) References Cited

U.S. PATENT DOCUMENTS

| | | | |
|---|---|---|---|
| 2009/0137252 A1 | 5/2009 | Masseroni et al. | |
| 2010/0202469 A1* | 8/2010 | Isaksson | H04L 47/10 370/412 |
| 2013/0188471 A1 | 7/2013 | Bade et al. | |
| 2013/0215750 A1* | 8/2013 | Beecroft | H04L 47/11 370/235 |
| 2013/0322255 A1* | 12/2013 | Dillon | H04L 47/22 370/236 |
| 2014/0164640 A1* | 6/2014 | Ye | H04L 47/30 709/235 |
| 2014/0164641 A1* | 6/2014 | Ye | H04L 47/127 709/235 |
| 2014/0362795 A1 | 12/2014 | Choi et al. | |
| 2015/0188830 A1* | 7/2015 | Zhao | H04L 47/12 370/235 |
| 2015/0373735 A1 | 12/2015 | Thubert et al. | |
| 2016/0056940 A1 | 2/2016 | Chae et al. | |
| 2017/0171897 A1* | 6/2017 | Ryu | H04L 5/006 |
| 2017/0180261 A1* | 6/2017 | Ma | H04L 47/25 |
| 2017/0339063 A1 | 11/2017 | Chundury et al. | |
| 2017/0339258 A1* | 11/2017 | Momchilov | H04L 69/18 |
| 2018/0331967 A1* | 11/2018 | Ho | H04L 43/0864 |
| 2019/0181984 A1* | 6/2019 | Ho | H04L 1/0076 |

OTHER PUBLICATIONS

Chundury, "Effective Management Models for Large and Emerging Telecom Networks", PhD Thesis, Department of Computer Science and Engineering, Indian Institute of Technology Madras, Chennai, India, Jul. 2008, 181 pages.

Demers et al., "Analysis and Simlulation of a Fair Queueing Algorithm", [online], [retrieved on Feb. 11, 2016]. Retrieved from the Internet: URL: <http://web.eecs.umich.edu/~mosharaf/Readings/WFQ.pdf>, Internetworking: Research and Experience, vol. 1, 3-26 (24 pages) (1990).

Wikipedia, "Weighted fair queueing", [online], Nov. 28, 2015, [retrieved on Feb. 11, 2016]. Retrieved from the Internet:, URL: <https://en.wikipedia.org/w/index.php?title=Weighted_fair_queueing&printable=yes>, pp. 1-3.

* cited by examiner

US 11,025,551 B2

WEIGHTED FAIR QUEUEING USING SEVERITY-BASED WINDOW IN RELIABLE PACKET DELIVERY NETWORK

This application is a continuation of application Ser. No. 15/160,436, filed May 20, 2016.

TECHNICAL FIELD

The present disclosure generally relates to weighted fair queueing using a severity-based window in a reliable packet delivery network.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Millions of Internet of Things (IoT) devices are being deployed as endpoint devices in centralized utility networks. An IoT device can be implemented as a wired or wireless resource-constrained device operating on limited battery power. Deployment of endpoint devices in centralized utility networks (e.g., power grid, natural gas distribution network, drinking water supply network, etc.) require reliable transfer of User Datagram Protocol (UDP) data packets. Hence, IoT devices can be deployed as endpoint devices in utility networks using a Reliable Packet Delivery Overlay Network (RPDON) that provides an acknowledgement for each transmitted UDP data packet, and that enables an IoT device to retransmit the transmitted UDP data packet if an acknowledgement is not received.

One concern in deploying multiple endpoint devices in an RPDON network is ensuring the RPDON server device receiving the transmitted UDP data packets is not overwhelmed with data traffic. One method for allocating processing resources of the RPDON server device among the multiple endpoint devices can be weighted fair queueing, where each endpoint device ("i") can be allocated evenly a specific weight "W" relative to a unit cycle "C" (e.g., time, data packets, bytes, etc.) required by the RPDON server device to process all the transmitted UDP data packets from all "N" endpoint devices, e.g., $W[i]=C/N$.

The above-described weighted fair queuing, however, still can delay transmission of a critically-severe data packet (e.g., a fire alarm notification) generated at an endpoint device because the critically-severe data packet still must wait at the end of the transmit queue of the endpoint device; hence, the critically-severe data packet cannot be transmitted until the endpoint device has received a sufficient number of acknowledgement messages for the data packets pending in the transmit queue that precede the critically-severe data packet.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
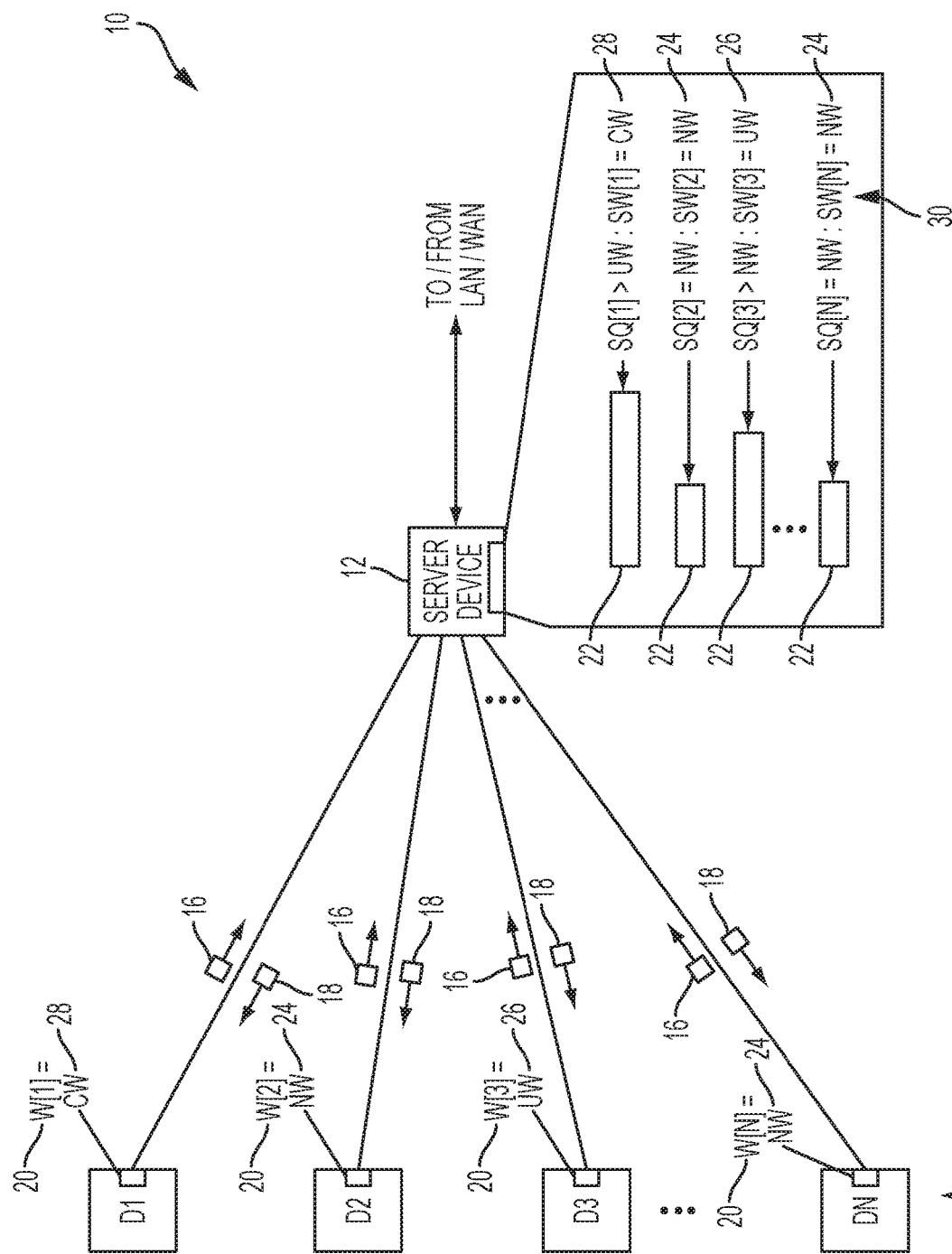
FIG. 1 illustrates an example system having an apparatus for selectively changing a window size, in response to a detected event severity, for a number of unacknowledged data packets that can be sent by the apparatus to a receiver device, according to an example embodiment.

In one embodiment, a method comprises a network device detecting an event severity encountered by the network device; the network device selectively changing a window size, for a maximum number of unacknowledged data packets that can be sent by the network device to a receiver device, to correspond to the event severity encountered by the network device; and the network device transmitting, to the receiver device, a number of data packets up to the window size, enabling the receiver device to detect the corresponding event severity encountered by the network device based on the number of unacknowledged data packets received by the receiver device from the network device.

In another embodiment, an apparatus comprises a processor circuit and a device interface circuit. The processor circuit is configured for detecting an event severity encountered by the apparatus. The processor circuit further is configured for selectively changing a window size, for a maximum number of unacknowledged data packets that can be sent to a receiver device, to correspond to the event severity. The device interface circuit is configured for transmitting, to the receiver device, a number of data packets up to the window size, enabling the receiver device to detect the corresponding event severity encountered by the apparatus based on the number of unacknowledged data packets received by the receiver device from the apparatus.

In another embodiment, one or more non-transitory tangible media are encoded with logic for execution by a machine and when executed by the machine operable for: detecting an event severity encountered by the machine; selectively changing a window size, for a maximum number of unacknowledged data packets that can be sent by the machine to a receiver device, to correspond to the event severity encountered by the machine; and transmitting, to the receiver device, a number of data packets up to the window size, enabling the receiver device to detect the corresponding event severity encountered by the machine based on the number of unacknowledged data packets received by the receiver device from the machine.

In another embodiment, a method comprises a receiver device receiving data packets from a network device relative to a prescribed window size of unacknowledged data packets; the receiver device determining an event severity encountered by the network device based on a number of unacknowledged data packets having been sent by the network device and pending acknowledgement by the receiver device, relative to the prescribed window size.

In another embodiment, an apparatus comprises a device interface circuit and a processor circuit. The device interface circuit is configured for receiving data packets from a network device relative to a prescribed window size of unacknowledged data packets. The processor circuit is configured for determining an event severity encountered by the network device based on a number of unacknowledged data packets having been sent by the network device and pending acknowledgement by the apparatus, relative to the prescribed window size.

In another embodiment, one or more non-transitory tangible media are encoded with logic for execution by a machine and when executed by the machine operable for: receiving data packets from a network device relative to a prescribed window size of unacknowledged data packets; and determining an event severity encountered by the network device based on a number of unacknowledged data packets having been sent by the network device and pending acknowledgement by the machine, relative to the prescribed window size.

DETAILED DESCRIPTION

Particular embodiments enable a network device (e.g., an endpoint IoT device), configured for transmitting data packets according to a weighted fair queueing protocol in a reliable UDP based network, to notify a receiver device (e.g., a server device) that the network device is encountering an event severity, without the necessity of the network device transmitting a data packet specifying the event severity. The network device can notify the receiver device of the event severity by increasing its window size (i.e., "weight") from a prescribed default level to an increased size corresponding to the event severity encountered by the network device.

FIG. 1 is a diagram illustrating an example network 10 having at least one server device (i.e., receiver network device) 12 and a plurality of endpoint network devices 14 configured for transmitting data packets 16, according to an example embodiment. Each endpoint network device 14 is configured for transmitting a data packet 16 according to a reliable UDP protocol, where each endpoint network device 14 stores each unacknowledged data packet 16 until reception of a corresponding acknowledgement message 18 is received from the receiver network device 12. Hence, transmission of a data packet 16 according to a reliable UDP protocol guarantees that the data packet 16 can be retransmitted, if needed, for delivery to the receiver network device 12. The example network 10 can be part of a larger RPDON data network, hence the receiver network device 12 can provide reachability to a local area network (LAN) and/or wide area network (WAN) (not shown).

Each endpoint network device 14, implemented for example as an IoT device in an RPDON network, also is configured for transmitting data packets 16 according to a weighted fair queuing operation that limits transmission of unacknowledged UDP data packets 16 by an endpoint network device 14 to no more than a transmission window size "W[i]" 20 associated with the endpoint network device "i" 14, where "i=1 to N": as illustrated in FIG. 1, the endpoint network device "D1" 14 has an associated transmission window size "W[1]" 20; the endpoint network device "D2" 14 has an associated transmission window size "W[2]" 20; the endpoint network device "D3" 14 has an associated transmission window size "W[3]" 20, etc.; and the last endpoint network device "DN" 14 has an associated transmission window size "W[N]" 20, where the RPDON data network 10 has "N" network devices.

The server device 12, also referred to herein as a receiver network device, is configured for storing the data packet 16 output by an endpoint network device "i" 14 into a corresponding server receive queue "SQ[i]" 22, also referred to herein as a server queue. Hence, any data packet 16 transmitted by the endpoint network device "D1" 14 is received and stored by the receiver network device 12 into the corresponding server queue "SQ[1]" 22; any data packet 16 transmitted by the endpoint network device "D2" 14 is received and stored by the receiver network device 12 into the corresponding server queue "SQ[2]" 22; any data packet 16 transmitted by the endpoint network device "D3" 14 is received and stored by the receiver network device 12 into the corresponding server queue "SQ[3]" 22, etc.; and any data packet 16 transmitted by the endpoint network device "DN" 14 is received and stored by the receiver network device 12 into the corresponding server queue "SQ[N]" 22.

Hence, the receiver network device 12 can execute weighted fair queuing processing on the received data packets 16 based on severity by processing, from each server queue "SQ[i]" 22, a number of the received data packets 16 equal to a corresponding server weight "SW[i]" allocated by the receiver network device 12 for the corresponding endpoint network device "i" 14 before moving to the next server queue "SQ[i+1]" 22 for the next endpoint network device 14.

Conventional implementations of a weighted fair queuing protocol in a reliable UDP based network 10 can raise a concern that an endpoint network device 14 would be unable to immediately notify the receiver network device 12 of a severe event, for example a fire alarm, in cases where the endpoint network device 14 has one or more data packets 14 queued for transmission while waiting for an acknowledgement message 18 from the receiver network device 12. Reliable UDP requires that data packets are transmitted in the order received, i.e., where a first-in-first-out (FIFO) based queuing is used; hence, an alarm data packet cannot be transmitted if other data packets are awaiting transmission in a device transmit queue. Consequently, an alarm data packet may end up delayed or undeliverable to previously-queued data packets.

According to example embodiments, an endpoint network device 14 can selectively change its transmission window size "W[i]" 20 in response to a detected event severity encountered by the endpoint network device 14. In particular, an endpoint network device 14 can be configured for using a "normal" window size "NW" 24 as a default during normal event conditions encountered by the endpoint network device 14, the term "normal" referring to event conditions that do not adversely affect operational performance of the endpoint network device 14, sensor data describing acceptable operating conditions, etc. In response to the endpoint network device 14 detecting an event severity that is encountered by the endpoint network device 14, for example based on a heat sensor detecting an elevated temperature indicating a cooling system is malfunctioning, etc., the endpoint network device 14 can selectively change its transmission window size "W[i]" 20 to correspond to the event severity encountered by the endpoint network device 14. As described below, the transmission window size "W[i]" 20 can be increased or enlarged to different levels larger than the normal window size "NW" 24, for example an urgent window size "UW" 26 larger than the normal window size "NW" 24, or a critical window size "CW" 28 larger than the urgent window size "UW" 26. Each of the endpoint network devices 14 and the receiver network device 12 are configured for identifying each of the normal window size "NW" 24, the urgent window size "UW" 26, and the critical window size "CW" 28 as identifying the corresponding event severity.

Hence, an endpoint network device 14 can use its changed transmission window size "W[i]" 20 (e.g., changed from the normal window size "NW" 24 to the urgent window size "UW" 26 or the critical window size "CW" 28) to transmit more data packets 16 beyond the number of unacknowledged data packets normally limited by the normal window size "NW" 24. The receiver network device 12, in response to detecting the number of unacknowledged data packets 16 exceeding the normal window size "NW" 24 based on an increase of received data packets 16 in the corresponding server queue "SQ[i]" 22, can determine that the corresponding endpoint network device 14 having transmitted the unacknowledged data packets 16 exceeding the normal window size "NW" 24 has encountered an increased event severity. In other words, the size of the server queue "SQ[i]" 22 (storing the unacknowledged data packets 16 from a specific endpoint network device 14) can directly correspond to the event severity encountered by the corresponding endpoint network device 14.

Hence, the example embodiments provide an "in-band" notification of an event severity encountered by an endpoint network device 14 based on the endpoint network device 14 selectively changing a transmission window size "W[i]" 20 from a "normal" window size "NW" 24 (used for normal events) to an urgent window size "UW" 26 in response to detecting an urgent event, or to a "critical" window size "CW" 28 in response to detecting a critical event, and transmitting a number of data packets 16 to the receiver network device 12 up to the changed window size. The receiver network device 12 can detect the corresponding event severity encountered by the endpoint network device 14 based solely on the size of the corresponding server queue "SQ[i]" 22 that indicates the number of unacknowledged data packets 16 received by the receiver network device 12 from the corresponding endpoint network device 14. Moreover, the receiver network device 12 can detect the corresponding event severity encountered by the endpoint network device 14 without the necessity of even receiving, from the receiver network device 12, the event notification (e.g., alarm packet) that initiated the increase in event severity.

As described below, the receiver network device 12 can respond to detecting the increase in the event severity by increasing the corresponding server window "SW[i]" 30 (i.e., server weight) used to determine the number of data packets 16 to process from the corresponding server queue "SQ[i]" 22 according to round robin weighted fair queuing based processing.

Hence, the receiver network device 12 can receive the data packets 16 from the endpoint network device "D1" 14, detect the corresponding event severity based on the size of the server queue "SQ[1]" 22 containing the unacknowledged data packets 16 transmitted by the endpoint network device "D1" 14 and exceeding the urgent window size "UW" 26, and in response selectively change (e.g., increase) the size of the server window "SW[1]" 30, for example from the (default) normal window size "NW" 24 to the critical window size "CW" 28 ("SW[1]=CW"). Similarly, the receiver network device 12 can receive the data packets 16 from the endpoint network device "D3" 14, detect the corresponding event severity based on the size of the server queue "SQ[3]" 22 containing the unacknowledged data packets 16 transmitted by the endpoint network device "D3" 14 and exceeding the normal window size "NW" 24, and in response selectively change (e.g., increase from "NW" or decrease from "CW") the size of the server window "SW [3]" 30 to the urgent window size "UW" 26 ("SW[3]=UW").

Consequently, the receiver network device 12 can increase processing priority for any of the endpoint network devices 14 encountering increased event severity by increasing the corresponding server window "SW[i]" 30, without having received the alarm packet identifying the event severity. Consequently, severity-awareness can be deployed in an RPDON network without the necessity of out-of-band messages, in-band Quality of Service (QoS) indicators within alarm packets, or out-of-sequence packet transmissions. Further, the endpoint network devices 14 are still limited by the transmission window size "W[i]" 20 in use, guaranteeing that the receiver network device 12 does not ever encounter a congestion condition.

Figure 2:
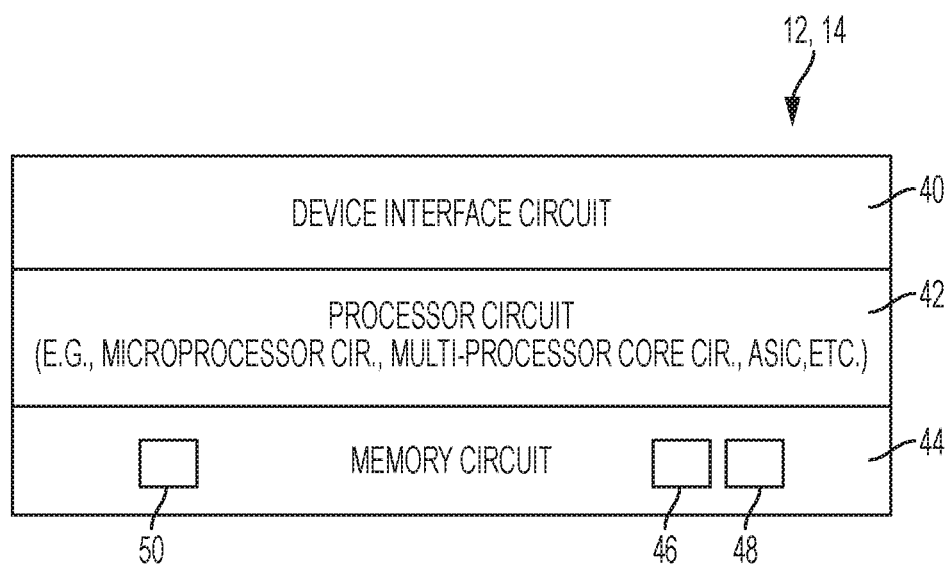
FIG. 2 illustrates an example implementation of any one of the sender or receiver network devices of FIG. 1.

FIG. 2 illustrates an example implementation of any one of the devices 12, 14 of FIG. 1, according to an example embodiment. Each apparatus 12, 14 is a physical machine (i.e., a hardware device) configured for implementing network communications with other physical machines via the network 10. The term "configured for" or "configured to" as used herein with respect to a specified operation refers to a device and/or machine that is physically constructed and arranged to perform the specified operation.

Each apparatus 12 and/or 14 can include a device interface circuit 40, a processor circuit 42, and a memory circuit 44. The device interface circuit 40 can include one or more distinct physical layer transceivers for communication with any one of the other devices 12 and/or 14; the device interface circuit 40 also can include an IEEE based Ethernet transceiver for communications with the devices of FIG. 1 via any type of data link (e.g., a wired or wireless link, an optical link, etc.). The processor circuit 42 can be configured for executing any of the operations described herein, and the memory circuit 44 can be configured for storing any data or data packets as described herein.

Any of the disclosed circuits of the devices 12 and/or 14 (including the device interface circuit 40, the processor circuit 42, the memory circuit 44, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 44) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit.

The memory circuit 44 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a FIFO-based transmit queue 46 or a retransmit queue 48). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer 50). Also note that the memory circuit 44 can be implemented dynamically by the processor circuit 42, for example based on memory address assignment and partitioning executed by the processor circuit 42.

Figure 3:
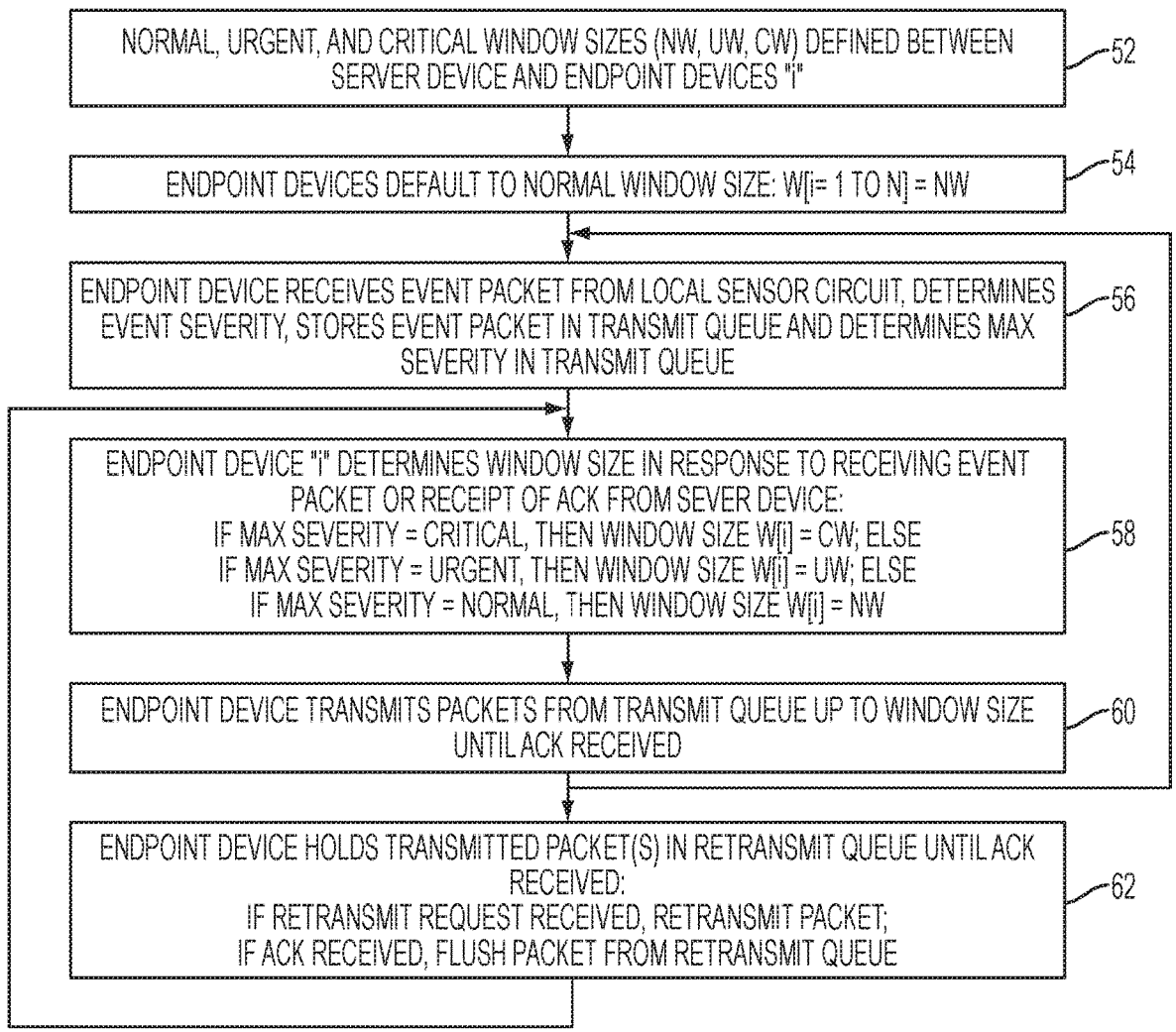
FIG. 3 illustrates an example method by an endpoint network device for selectively changing a window size, in response to a detected event severity, for a number of unacknowledged data packets that can be sent to a receiver device, according to an example embodiment.

FIG. 3 illustrates an example method by an endpoint network device 14 for selectively changing a window size, in response to a detected event severity, for a number of unacknowledged data packets 16 that can be sent to a receiver device 12, according to an example embodiment.

Figure 4:
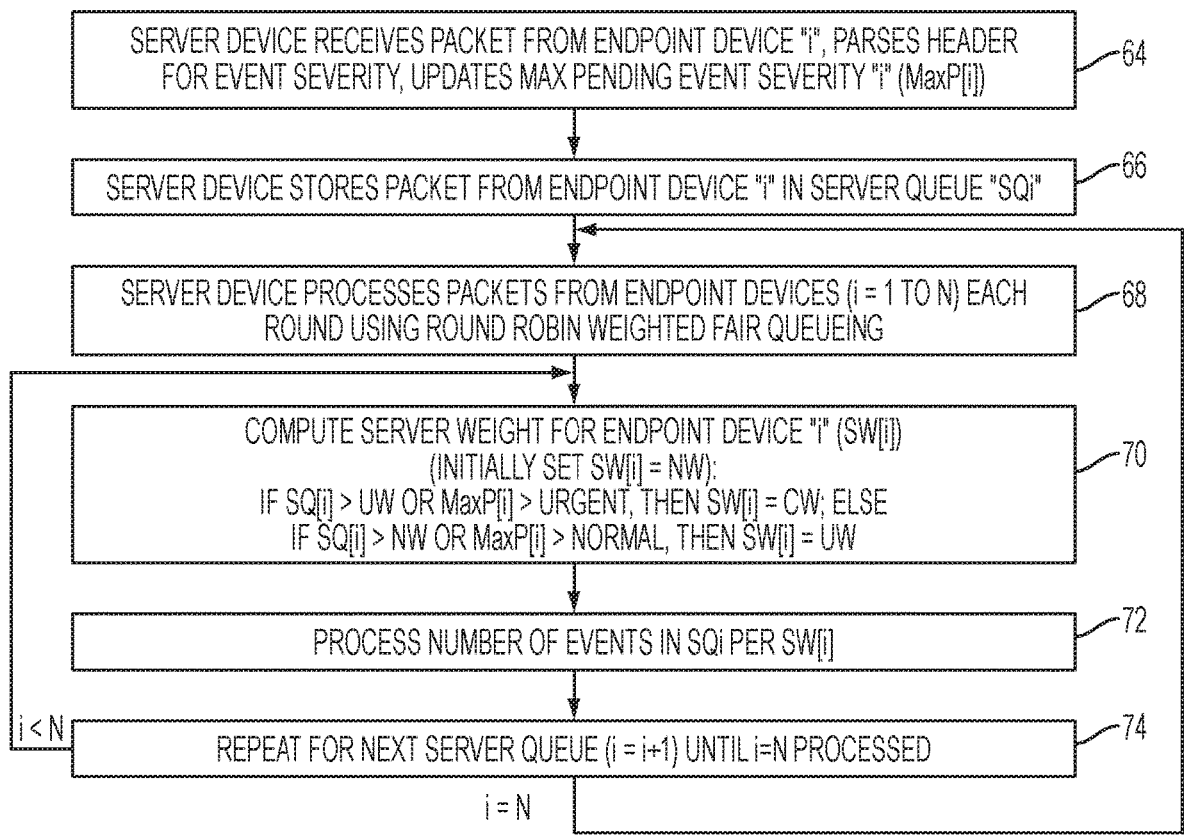
FIG. 4 illustrates an example method by a receiver device determining an event severity encountered by an endpoint network device based on a number of unacknowledged data packets having been sent by the endpoint network device and pending acknowledgement by the receiver device, relative to a prescribed window size, according to an example embodiment.

FIG. 4 illustrates an example method by a receiver device 12 determining an event severity encountered by an endpoint network device 14 based on a number of unacknowledged data packets having been sent by the endpoint network device and pending acknowledgement by the receiver device, relative to a prescribed window size, according to an example embodiment.

The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Referring to FIG. 3, the receiver network device 12 and each of the endpoint network device 14 can be configured in operation 52 to recognize the normal window size "NW" 24, the urgent window size "UW" 26, and the critical window size "CW" 28. For example, the receiver network device 12 and each of the endpoint network devices 14 can be programmed in their corresponding memory circuit 44 with the normal window size "NW" 24, urgent window size "UW" 26, and critical window size "CW" 28 by a network administrator, a centralized controller (not shown) in the RPDON data network 10, etc. Since the receiver network device 12 can detect any change in the number of data packets 16 in a server queue "SQ[i]" 22, a change in size of a single data packet can be sufficient to distinguish between the window sizes (and respective severity conditions): example window sizes for the normal window size "NW" 24, the urgent window size "UW" 26, and the critical window size "CW" 28 can be ten ("10") packets, eleven ("11") packets, and twelve ("12") packets, respectively, also expressed as a window size pattern "10/11/12" for the respective window sizes. Other window size patterns can be used based on network deployment or implementation (e.g., number "N" of endpoint network devices 14, data traffic rates, etc.), for example "10/15/20" or a nonlinear window size pattern such as "8/12/18", "8/16/32", etc.

Hence, the first, second, and third prescribed window sizes 24, 26, and 28 are recognized by the receiver network device 12, and any other endpoint network device 14 sending data packets 16 to the receiver network device 12, as indicating the endpoint network device 14 encountering a normal event severity, an urgent event severity, or a critical event severity, respectively. If desired, operation 52 could be repeated at different times to change the first, second, and third prescribed window sizes 24, 26, and 28, for example based on network topology updates, route recalculation, etc.

The processor circuit 42 of each of the endpoint network devices 14 in operation 54 of FIG. 3 initially sets its corresponding transmission window size "W[i]" 20 to a default setting of the normal window size "NW" 24 for normal operations.

The processor circuit 42 of each endpoint network device 14 is configured for receiving (or detecting) in operation 56 an event packet from a local sensor circuit, for example a physical sensor physically attached to the endpoint network device 14 or physically incorporated into the endpoint network device 14 as a single sensor device or "sensor mote". The "receiving" can be based on the processor circuit 42 detecting, for example, a data structure (e.g., a descriptor file) identifying storage of the event packet into the FIFO transmit queue 46; alternately the processor circuit 42 can receive the event packet from the local sensor circuit via a local (internal) data bus. The processor circuit 42 in operation 56 is configured for detecting the event severity associated with the event packet, for example based on parsing the corresponding header of the event packet, and storing in operation 56 the event packet in the FIFO transmit queue 46. In one embodiment, the processor circuit 42 can increment an internal counter, e.g., "Ctr_Critical" or "Ctr_Urgent" (not shown in the Figures) specifying the number of untransmitted data packets in the FIFO transmit queue 46 and/or unacknowledged data packets 16 identifying either a critical severity or an urgent severity.

The processor circuit 42 of the endpoint network device 14 in operation 58 is configured for determining the transmission window size "W[i]" 20 in response to receiving any event packet, or in response to receiving any acknowledgement message 18 from the receiver network device 12.

Hence, the processor circuit 42 of the endpoint network device 14 can determine the event severity encountered by the network device endpoint network device 14, for example based on determining whether any of the "Ctr_Critical" or "Ctr_Urgent" specify a nonzero value: the processor circuit 42 of the endpoint network device 14 can set the transmission window size "W[i]" 20 to the critical window size "CW" 28 only in response to the processor circuit 42 determining the maximum severity ("Max Severity") is critical (e.g., based on a nonzero value for the counter "Ctr_Critical"), as illustrated in FIG. 1 by the endpoint network device "D1" 14 setting its corresponding transmission window size "W[1]" 28 equal to the critical window size "CW" 28 ("W[1]=CW"); the processor circuit 42 of the endpoint network device 14 can set the transmission window size "W[i]" 20 to the urgent window size "UW" 26 only in response to the processor circuit 42 determining the maximum severity ("Max Severity") is urgent (e.g., based on a zero value for the counter "Ctr_Critical" and a nonzero value for the counter "Ctr_Urgent"), as illustrated in FIG. 1 by the endpoint network device "D3" 14 setting its corresponding transmission window size "W[3]" 28 equal to the urgent window size "UW" 26 ("W[3]=UW"); if the processor circuit 42 determines the maximum severity ("Max Severity") is normal (e.g., based on a zero value for the counter "Ctr_Critical" and a zero value for the counter "Ctr_Urgent"), the processor circuit 42 of the endpoint network device 14 can set the transmission window size "W[i]" 20 to the normal window size "NW" 24, as illustrated in FIG. 1 by the endpoint network devices "D2" and "DN" 14 setting their respective transmission window sizes "W[2]" and "W[N]" 28 equal to the normal window size "NW" 24 ("W[2]=NW", "W[N]=NW").

Hence the processor circuit 42 of each endpoint network device 14 is configured for selecting one of a first prescribed window size "NW" 24 for normal event severity, a second prescribed window size "UW" 26 greater than the first prescribed window size "NW" 24 for a second event severity (e.g., urgent) greater than the normal event severity, or a third prescribed window size "CW" 28 greater than the second prescribed window size "UW" 26 for a third event severity greater (e.g., critical) than the second event severity. According to example embodiments, any number of two or more severity levels can be used for generation of two or more prescribed window sizes, respectively.

Hence, the device interface circuit 40 of each endpoint network device 14 is configured for transmitting in operation 60, to the receiver network device 12, a number of data packets 16 up to the corresponding transmission window size "W[i]" 20, enabling the receiver network device 12 to detect the corresponding event severity encountered by the endpoint network device 14 based on the number of unacknowledged data packet 16 received by the receiver network device 12 from the endpoint network device 14, i.e., based on the size of the corresponding server queue "SQ[i]" 22. The retransmit queue 48 of the endpoint network device 14 is configured for storing in operation 62 each unacknowledged data packet 16 until reception of a corresponding acknowledgement message 18 from the receiver network device 12. Hence, the processor circuit 42 of the endpoint network device 14 is configured for selectively retransmitting one of the unacknowledged data packets 16, stored in the retransmit queue 48, in response to a retransmit request from the receiver network device 12. The processor circuit 42 in operation 62 also is configured for deleting (i.e., "flushing") a transmitted data packet 16 from the retransmit queue 48 (and selectively decrementing the counter "Ctr_U-rgent" or "Ctr_Critical", as appropriate) in response to receiving the corresponding acknowledgement message 18 from the receiver network device 12.

FIG. 4 illustrates an example method by the receiver network device 12 determining an event severity encountered by an endpoint network device 14 based on a number of unacknowledged data packets having been sent by the endpoint network device 14 and pending acknowledgement (in the corresponding server queue "SQ[i]" 22) by the receiver network device 12, relative to a prescribed window size, according to an example embodiment.

The device interface circuit 40 of the receiver network device 12 in operation 64 is configured for receiving data packets 16 from an endpoint network device 14 relative to a prescribed server window size "SW[i]" 30 of unacknowledged data packets. As described previously with respect to operation 52 of FIG. 3, the receiver network device 12 can be configured to recognize the normal window size "NW" 24, the urgent window size "UW" 26, and the critical window size "CW" 28; alternately the processor circuit 42 of the receiver network device 12 can be configured for defining the normal window size "NW" 24, the urgent window size "UW" 26, and the critical window size "CW" 28, and notifying the endpoint network devices 14 of the respective normal window size "NW" 24, urgent window size "UW" 26, and critical window size "CW" 28 (e.g., based on sending network management messages, etc.).

The processor circuit 42 of the receiver network device 12 in operation 64 is configured for determining the event severity encountered by the endpoint network device 14 having transmitted the data packet 16, for example based on parsing the header of the received data packet 16 to determine the severity (e.g., header "Severity" equals normal, urgent, or severe; a pending event severity value "p[i]", etc.).

The processor circuit 42 of the receiver network device 12 in operation 64 can be configured for implementing one or more data structures for storing the event severity of the corresponding endpoint network device 14 based on the received data packets 16, for example a maximum pending event severity "Max P[i]" identifying the maximum pending severity; the processor circuit 42 also can store, for the corresponding endpoint network device 14, a counter "Ctr_Urgent[i]" and/or "Ctr_Critical[i]" (not shown in the Figures) identifying the respective urgent and/or critical events specified in the unacknowledged data packets 16 stored in the corresponding server queue "SQ[i]" 22. Hence, the processor circuit 42 of the receiver network device 12 in operation 64 can selectively increment one of the counters "Ctr_Urgent[i]" or "Ctr_Critical[i]" in response to detecting a data packet 16 having a header specifying an urgent severity or critical severity, respectively.

The processor circuit 42 of the receiver network device 12 is configured for storing in operation 66 the received data packet 16 into the corresponding server queue "SQ[i]" 22 within the receive buffer 50 of the memory circuit 44. As described with respect to operation 54 of FIG. 3, the endpoint network devices 14 start with the normal window size "NW" 24 as the default window size, hence the receiver network device 12 typically will receive up to the normal window size "NW" 24 from a given endpoint network device 14, resulting in the corresponding server queue "SQ[i]" 22 having up to a normal window size "NW" 24.

The processor circuit 42 of the receiver network device 12 in operation 68 is configured for utilizing a round robin weighted fair queuing for processing the received data packets 16, where the processor circuit 42 processes a number of the received data packets 16 from a corresponding endpoint network device 14 in the corresponding server queue "SQ[i]" 22 according to the corresponding window size "SW[i]" 30. The round robin weighted fair queuing begins in operation 70, where the processor circuit 42 of the receiver network device 12 computes the server weight (i.e., the size) of a server window "SW[i]" 30 for one of the endpoint network devices 14. As described previously, the server window "SW[i]" 30 can initially be set to the default normal window size "NW" 24 ("SW[i]=NW").

If in operation 70 the processor circuit 42 of the receiver network device 12 determines that the server queue "SQ[i]" 22 for the endpoint network device "i" 14 is greater than the urgent window size "UW" 26, the processor circuit 42 can set the corresponding server window "SW[i]" 30 to the critical window size "CW" 28 ("SW[i]=CW"); hence, the processor circuit 42 can increase the prescribed size of the server window "SW[i]" 30 from the normal window size "NW" 24 to the critical window size "CW" 28 based on the number of unacknowledged data packets 16 having been sent by the endpoint network device 14 and pending acknowledgement by the receiver network device 12, without the necessity of having received any data packet 16 specifying the critical event encountered by the endpoint network device 14 (and which may be still pending transmission in the FIFO transmit queue 46 of the endpoint network device 14).

If the number of received data packets 16 in the corresponding server queue "SQ[i]" 22 is less than the normal window size "NW" 24, the processor circuit 42 of the receiver network device 12 in operation 70 also can determine the event severity based on the parsing of the stored data packets 16 in the server queue "SQ[i]" 22 (e.g., based on the maximum pending event severity "Max P[i]" identifying the maximum pending severity). Hence, if in operation 70 the maximum pending event severity "Max P[i]" is greater than "urgent", the processor circuit 42 can increase the prescribed size of the server window "SW[i]" 30 to the critical window size "CW" 28.

If in operation 70 the processor circuit 42 of the receiver network device 12 determines that the server queue "SQ[i]" 22 for the endpoint network device "i" 14 is not greater than the urgent window size "UW" 26 but is greater than the normal window size "NW" 24, or the processor circuit 42 determines the maximum pending event severity "Max P[i]" is not greater than "urgent" but is greater than "normal", the processor circuit 42 can increase the prescribed size of the server window "SW[i]" 30 to the urgent window size "UW" 26.

Although not shown explicitly in FIG. 4, the processor circuit 42 of the receiver network device 12 in operation 70 also can set the prescribed size of the server window "SW[i]" 30 to the normal window size "NW" 24 if the size of the server queue "SQ[i]" 22 is less than or equal to the normal window size NW" 24 and the maximum pending event severity "Max P[i]" is equal to normal.

The processor circuit 42 of the receiver network device 12 in operation 72 can process the number of events in the data packets 16 in the corresponding server queue "SQ[i]" 22 for the corresponding endpoint network device "i" 14 based on the server window "SW[i]" 30 computed in operation 70, generate the respective acknowledgement messages 18 for the corresponding endpoint network device "i" 14, and selectively decrement the counters "Ctr_Urgent[i]" and/or "Ctr_Critical[i]", as appropriate. If the processor circuit 42 of the receiver network device 12 detects a missing packet (e.g., based on a detected out-of-sequence value among the data packets 16 stored in the server queue "SQ[i]" 22, the receiver network device 12 in operation 72 can generate and operation a retransmit request, enabling the endpoint network device 14 to retransmit the missing data packet 16 (as described previously with respect to operation 62 of FIG. 3).

The processor circuit 42 of the receiver network device 12 can repeat in operation 74 the operations 70 and 72 for each of the endpoint network devices 14, until all of the endpoint network devices 14 have been processed (i=N).

According to example embodiments, a network device can selectively change its prescribed window size, used for weighted fair queuing of data packets, in response to detecting an event severity encountered by the network device. The prescribed window size can be changed to correspond to the event severity, enabling a receiver device to determine the event severity based solely on the number of unacknowledged data packets having been sent by the network device and pending acknowledgement by the receiver device, relative to the prescribed window size. The receiver can increase its prescribed window size for the network device based on the determined event severity, for increased (prioritized) processing without the necessity of receiving the data packet that specifies the event severity. The example embodiments enable the receiver to detect the event severity without the necessity of a QoS indicator in the data packet (which may be held in the transmit queue of the network device), and without the necessity of out-of-band signaling.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
a receiver device receiving User Datagram Protocol (UDP) data packets from a network device relative to a prescribed window size that limits a maximum number of unacknowledged UDP data packets that can be received from the network device according to a reliable UDP protocol; and
the receiver device determining an event severity encountered by the network device based solely on a number of unacknowledged UDP data packets having been received by the receiver device from the network device and pending acknowledgement by the receiver device relative to the prescribed window size according to the reliable UDP protocol, and without receiving any data packet specifying the corresponding event severity.

2. The method of claim 1, further comprising:
the receiver device increasing the prescribed window size to a second prescribed window size based on the number of unacknowledged UDP data packets having been received by the receiver device from the network device and pending acknowledgement by the receiver device;
the receiver device processing the unacknowledged UDP data packets from the network device based on the second prescribed window size, relative to respective window sizes associated with other network devices according to a weighted fair queueing.

3. The method of claim 2, further comprising:
determining the number of unacknowledged UDP data packets having been received by the receiver device from the network device has decreased below the second prescribed window size and the prescribed window size;

reducing processing capacity for the network device to correspond with the prescribed window size in response to determining the number of unacknowledged UDP data packets has decreased below the second prescribed window size and the prescribed window size.

4. The method of claim 1, wherein the determining includes determining an increase in event severity solely based on a corresponding increase of a single unacknowledged UDP data packet having been received by the receiver device from the network device and pending acknowledgement by the receiver device relative to the prescribed window size.

5. The method of claim 1, further comprising selectively increasing processing of the unacknowledged data packets from the network device based on the determined event severity.

6. The method of claim 1, wherein the event severity detected by the receiver device is a sensed physical attribute detected by the network device.

7. An apparatus comprising:
a device interface circuit configured for receiving User Datagram Protocol (UDP) data packets from a network device relative to a prescribed window size that limits a maximum number of unacknowledged UDP data packets that can be received from the network device according to a reliable UDP protocol; and
a processor circuit configured for determining an event severity encountered by the network device based solely on a number of unacknowledged UDP data packets having been received by the apparatus from the network device and pending acknowledgement by the apparatus relative to the prescribed window size according to the reliable UDP protocol, and without receiving any data packet specifying the corresponding event severity.

8. The apparatus of claim 7, wherein:
the processor circuit is configured for increasing the prescribed window size to a second prescribed window size based on the number of unacknowledged UDP data packets having been received by the apparatus from the network device and pending acknowledgement by the apparatus;
the processor circuit is configured for processing the unacknowledged UDP data packets from the network device based on the second prescribed window size, relative to respective window sizes associated with other network devices according to a weighted fair queueing.

9. The apparatus of claim 8, wherein the processor circuit is configured for:
determining the number of unacknowledged UDP data packets having been received by the apparatus from the network device has decreased below the second prescribed window size and the prescribed window size;
reducing processing capacity for the network device to corresponding with the prescribed window size in response to determining the number of unacknowledged UDP data packets has decreased below the second prescribed window size and the prescribed window size.

10. The apparatus of claim 7, wherein the processor circuit is configured for detecting an increase in event severity solely based on a corresponding increase of a single unacknowledged UDP data packet having been received by the apparatus from the network device and pending acknowledgement by the apparatus relative to the prescribed window size.

11. The apparatus of claim 7, wherein the processor circuit is configured for selectively increasing processing of the unacknowledged data packets from the network device based on the determined event severity.

12. The apparatus of claim 7, wherein the event severity detected by the processor circuit is a sensed physical attribute detected by the network device.

13. One or more non-transitory tangible media encoded with logic for execution by a machine and when executed by the machine operable for:
receiving User Datagram Protocol (UDP) data packets from a network device relative to a prescribed window size that limits a maximum number of unacknowledged UDP data packets that can be received from the network device according to a reliable UDP protocol; and
determining an event severity encountered by the network device based solely on a number of unacknowledged UDP data packets having been received by the machine from the network device and pending acknowledgement by the machine relative to the prescribed window size according to the reliable UDP protocol, and without receiving any data packet specifying the corresponding event severity.

14. The one or more non-transitory tangible media of claim 13, further operable for:
increasing the prescribed window size to a second prescribed window size based on the number of unacknowledged UDP data packets having been received by the machine from the network device and pending acknowledgement by the machine; and
processing the unacknowledged UDP data packets from the machine based on the second prescribed window size, relative to respective windows associated with other network devices according to a weighted fair queueing.

15. The one or more non-transitory tangible media of claim 14, further operable for:
determining the number of unacknowledged UDP data packets having been received by the machine from the network device has decreased below the second prescribed window size and the prescribed window size;
reducing processing capacity for the network device to correspond with the prescribed window size in response to determining the number of unacknowledged UDP data packets has decreased below the second prescribed window size and the prescribed window size.

16. The one or more non-transitory tangible media of claim 13, wherein the determining includes determining an increase in event severity solely based on a corresponding increase of a single unacknowledged UDP data packet having been received by the machine from the network device and pending acknowledgement by the machine relative to the prescribed window size.

17. The one or more non-transitory tangible media of claim 13, further operable for selectively increasing processing of the unacknowledged data packets from the network device based on the determined event severity.

18. The one or more non-transitory tangible media of claim 13, wherein the event severity detected by the machine is a sensed physical attribute detected by the network device.

* * * * *